United States Patent [19]

Bolton et al.

[11] 4,412,920

[45] Nov. 1, 1983

[54] FILTER WITH TOP SPRAY

[76] Inventors: Joseph A. Bolton, Summit La., Glens Falls, N.Y. 12801; Armond A. Brown, Burgoyne Rd., #6, at the Point, Saratoga Spa., N.Y. 12866

[21] Appl. No.: 247,336

[22] Filed: Mar. 25, 1981

Related U.S. Application Data

[63] Continuation-in-part of Ser. No. 92,045, Nov. 7, 1979, abandoned.

[51] Int. Cl.³ .............................................. B01D 29/38
[52] U.S. Cl. ..................................... 210/409; 210/413
[58] Field of Search ............... 210/332, 355, 407, 409, 210/413–415, 791, 797, 391, 410

[56] References Cited

U.S. PATENT DOCUMENTS

| 624,580 | 5/1899 | Tousey | 210/409 X |
|---|---|---|---|
| 894,679 | 7/1908 | Melvin | 210/409 X |
| 1,046,108 | 12/1912 | Powers | 210/391 |
| 1,139,825 | 5/1915 | Vandercook | 210/409 X |
| 1,993,214 | 3/1935 | Hass | 210/415 X |
| 2,258,063 | 10/1941 | Meyer | 210/409 |
| 2,608,910 | 9/1952 | McCrystle | 210/409 X |
| 2,658,623 | 11/1953 | Thornhill | 210/409 |
| 2,889,048 | 6/1959 | Nordin | 210/409 |
| 3,112,263 | 11/1963 | Ellila | 210/411 |
| 3,532,220 | 10/1970 | Lewis | 210/409 X |
| 3,785,969 | 1/1974 | Molls et al. | 210/791 X |

FOREIGN PATENT DOCUMENTS

| 206373 | 11/1959 | Austria | 210/409 |
|---|---|---|---|
| 2446746 | 4/1975 | Fed. Rep. of Germany | 210/413 |

Primary Examiner—Robert H. Spitzer

[57] ABSTRACT

A screen filter device for removing solid particles from a liquid is disclosed. The device includes a spray or shower for cleaning the filter media. In operation, a first liquid containing particulate matter flows over the filter media having an opening formed therein. Spray nozzles are arranged with respect to the filter media to impinge cleansing liquid on the surface of the filter media over which the first liquid flows. The cleansing liquid carries particulate matter continuously and in a spiral fashion towards the opening within the filter media.

7 Claims, 4 Drawing Figures

FILTER WITH TOP SPRAY

CROSS REFERENCE TO RELATED APPLICATIONS

This application is a continuation-in-part of Ser. No. 92,045 filed Nov. 7, 1979, now abandoned.

BACKGROUND OF THE INVENTION

This invention is directed to a screen filter device for removing solid particles from a liquid for purposes of separating the solid particles out for recovery and/or cleansing the liquid for recirculation. The general category of filter device to which this invention is directed includes those in which a spray or shower is used to clean the filter media.

There are many such devices available in the art such as for example that shown in U.S. Pat. No. 3,112,263. In that device the screen filter is fitted with a sloping screen and the liquid to be filtered is flowed over the screen radially towards the center. Impurities are removed from the screen by a shower of liquid directed upwards and through the screen from beneath.

There are many problems with such a device which is typical of the art. For example it has been thought that to properly unplug a screen seal from above the spray must be directed from beneath. This has resulted in the fines dropping back on the source of the spray such as on nozzles rotating beneath the screen, thereby loading the arms. Additionally, the spray from below must pass through the screen raising pressure requirements to the possible extent of the spray raising or lifting the screen unless additional steps are taken to fasten it securely against vertical-upward displacement.

The present invention is intended to be an improvement over the art as represented by said U.S. Pat. No. 3,122,263.

SUMMARY OF THE INVENTION

The applicants have found that with the unique combination disclosed herein, the spraying can take place from above and provide a proper result.

The subject invention includes the use of a shower assembly with multiple fan nozzles for cleaning a filter media from its feed side along with moving particles greater than the media openings towards a discharge port.

The filter media could be a filter mesh, wedge wire, perforations, etc. Shape of the media may be circular, rectangular, pie section, horizontal or sloped at any angle between 0° and 30°.

The feed liquid to the media can be separated into two streams: one containing particles greater than the filter media openings, the other stream particles smaller.

The device has particular application for use as a tailing screen or the removing of rejectable material from a liquid stream; the filtering of fibrous material from black liquor ahead of the evaporators; and the fractioning of particles into two streams, one containing greater than the filter media opening, the other smaller.

With this device the motor (for pipe rotation), shower pipes, water supply conduits and drive assemble, all located above the filter screen so that the particles in the filtrate do not build up on the mechanism.

Also, the spray from the shower pipe nozzles hits the filter screen at an acute angle as opposed to the blunt angle used in the system using "under filter spraying" so that the spray acts as a doctor to shear particles from the top of the screen and urge those too large to pass through the screen along the screen to the central depository for larger particles. The particles are moved continuously in a spiral fashion to the central depository.

Additionally, the radially disposed spray pipes may have a horizontally arced configuration which assists in urging larger particles toward central compartment.

DESCRIPTION OF THE PREFERRED EMBODIMENT

Figure 2:
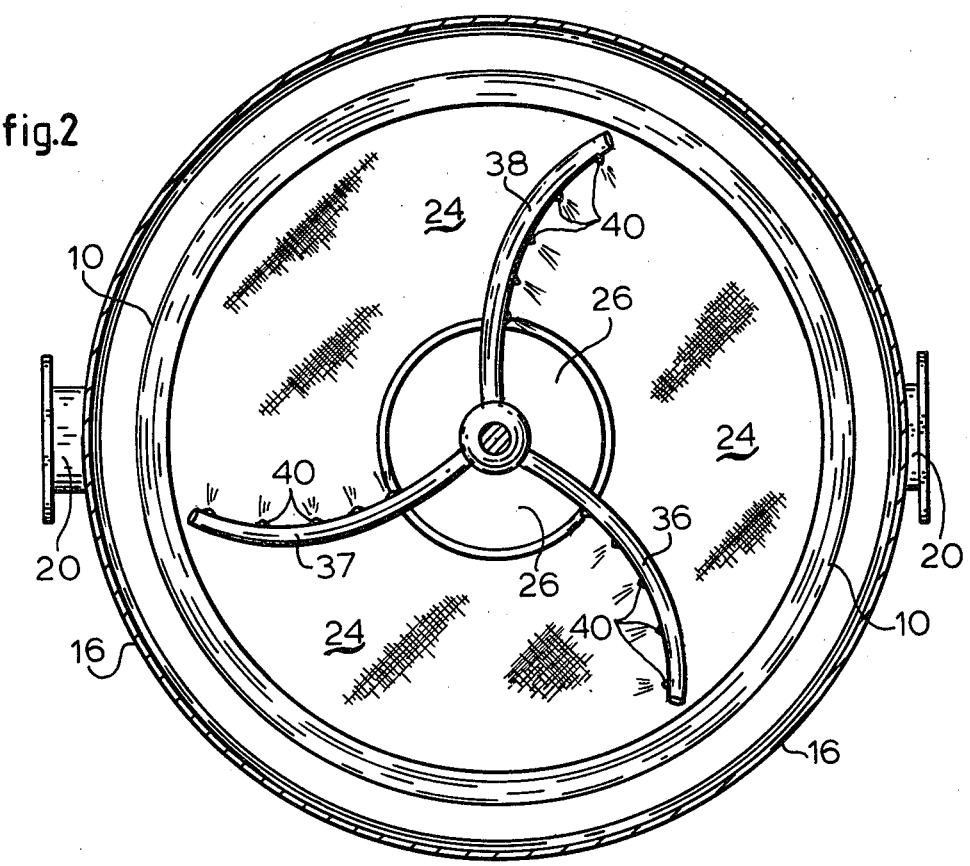
FIG. 2 is a sectional view taken along the line 2—2 in the direction of the arrows in FIG. 1.

The filter device of the subject invention is shown in the Figures and includes cylindrical container 10 having open top and bottom 12 and 14 respectively concentrically arranged within feed container 16, the side wall thereof extending above container 10. A third container 18, also concentrically arranged is disposed within container 10 with its open top considerably beneath the top of container 10 and its bottom communicating with and arranged to feed into horizontal outlet pipe 20. An inlet pipe 22 is provided for feeding particulate containing liquid into feed container 16. A substantially horizontal circular screen 24 is fitted at the top of container 10. The screen 24 has an open circular center 26 which is disposed above container 18 with its center generally on the line of the vertical axis to container 18. In the embodiment shown the opening 26 is less in diameter than the diameter of container 18.

A cover 28 is provided for feed container 16. Motor 30 and gear reduction box 32 which are supported by the cover rotate shaft 34 which projects downwardly through the cover. On the end of shaft 34 there are mounted radially disposed spray pipes 36, 37 and 38, each of which is of horizontally arced configuration and supports a series of spray nozzles 40. Three such pipes are shown in the present embodiment however more or less such pipes can be provided.

Shaft 34, which is hollow, extends upwardly from the gear box and through the thrust bearing 42. The shaft is coupled to rotating swivel joint 44. Conduit 46 is provided to supply cleansing water, or other fluid to the spray nozzles 40 via shaft 34. The nozzles 40 are arranged at an angle with the horizontal to direct the spray at an angle to the surface of the screen. The angle is in the order of 10° to 45° with the screen to provide a good pushing or material moving spray component so that the spray acts as a doctor knife on the top of the screen.

It is contemplated that the spray arms will be rotated in a clockwise direction as seen from above and as shown in FIG. 2 with the arms arced (somewhat concave) in the leading edge so that particles from the liquid to be filtered on the upper surface of the screen, will be directed toward the center. The liquid will carry the particles continuously in a spiral fashion towards the open circular center 26.

In operation the liquid containing particles to be separated is allowed to enter the feed container 16 through inlet 22. This liquid builds up to a height where it overflows the wall of container 10, flows onto screen 24 where the liquid component and fines (particles sufficiently small to pass through the filter screen 24) pass through the screen and into container 10, and therethrough, downwardly by action of gravity and out bottom 14 for collection or recirculation as desired.

The larger particles contained in the liquid to be filtered do not pass through the screen. The liquid from the spray nozzles 40 impinges on the upper surface of the screen as the arms rotate to doctor these large particles from the upper surface of the screen and direct them toward the center where they pass through opening 26 and by gravity, and such hydraulic force as is being generated, into container 18 and out thereof through conduit 20 for collection or other disposal.

A plug 48 and removal handle 50 are provided to allow communication of container 16 with conduit 20 when desired for disposal of the content of container 16 at the completion of use or any other indicated time.

Figure 3:
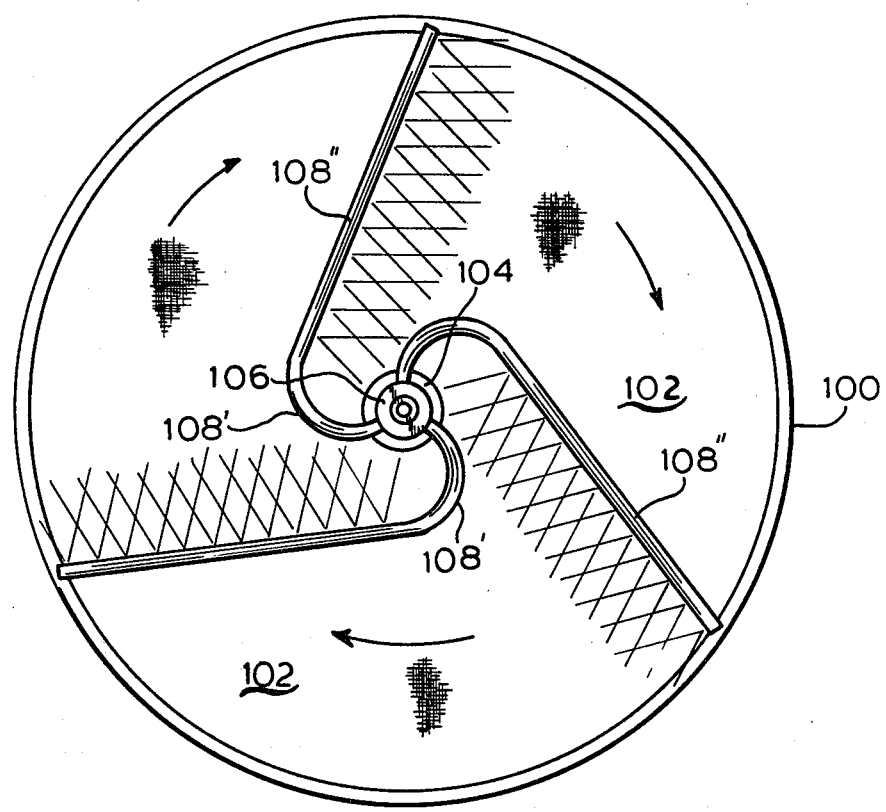
FIG. 3 is a plan view of a portion of a second embodiment of the invention.
Figure 4:
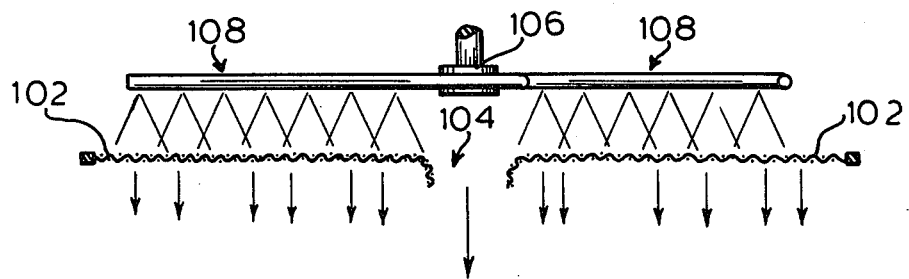
FIG. 4 is an elevation view of a portion of the apparatus shown in FIG. 3.

A second embodiment of the invention is schematically illustrated in FIGS. 3 and 4. A number of the details shown in FIGS. 1 and 2 have been omitted to simplify the drawings, but it will be understood that the illustrated features are to be used in conjunction with the basic structure of the first embodiment so as to function in a similar manner.

A cylindrical container 100 having an open top and bottom is provided. A substantially horizontal circular screen 102 is fitted near the top of the container 100. The screen 102 has a circular central discharge opening 104. Instead of being horizontal, the screen could be sloped towards the opening at an angle between 0-30 degrees.

Figure 1:
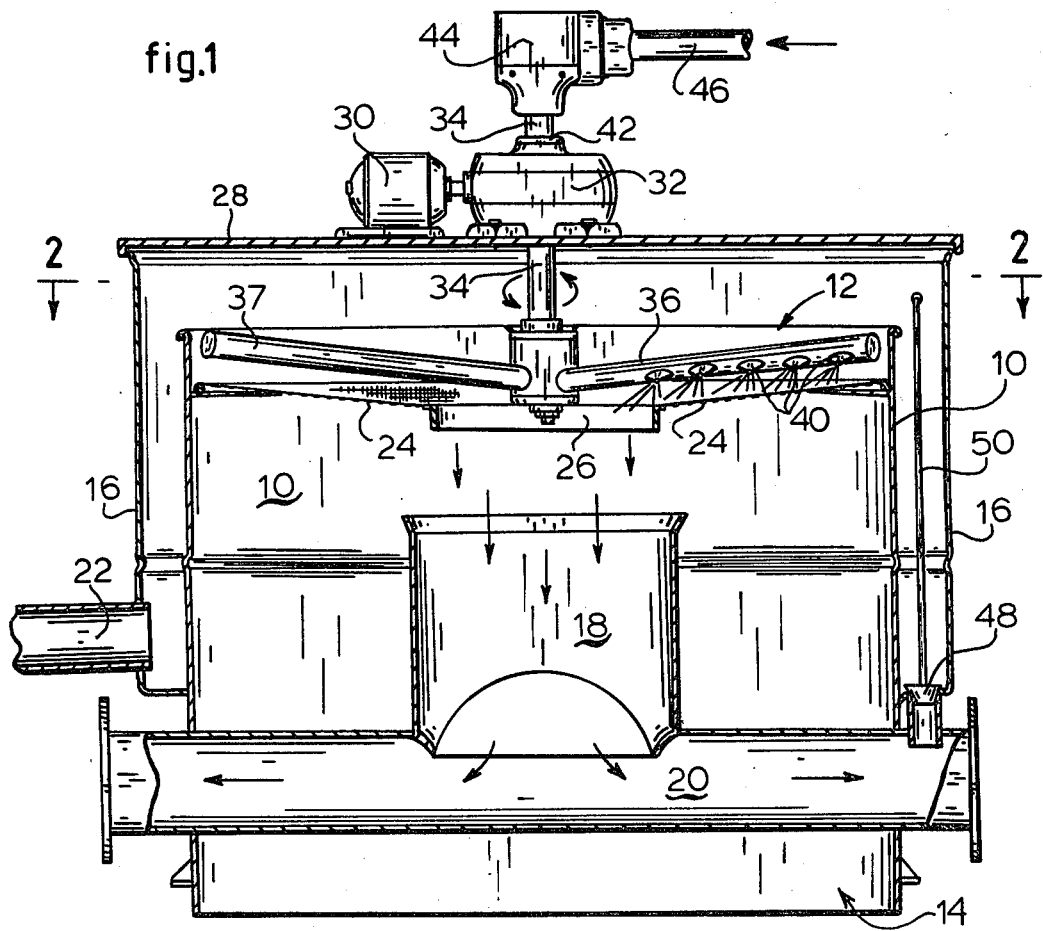
FIG. 1 is a partially sectional plan view of the unit constructed in accordance with the teachings of this invention.

A rotatable hollow shaft 106 extends substantially perpendicularly with respect to the plane of the screen and is coaxial with the longitudinal axis of the container 100. A plurality of equally spaced spray pipes 108 extend from the shaft. Each spray pipe includes a plurality of spray nozzles arranged along the leading edges thereof. Means (not shown) similar to the motor 30 and associated structures shown in FIGS. 1-2 are provided to rotate the shaft 106 and pipes 108 in the direction of the spray nozzles. The arrows in FIG. 3 show the direction of rotation which is clockwise in the illustrated embodiment.

The spray pipes 108 are each of cane-shaped configuration having an arcuate portion 108' and a straight elongated portion 108". The ends of the pipes defined by the arcuate portions are secured to the shaft 106. The straight portions have lengths which approximate the radius of the screen. They extend to the outermost portions of the screen so that the spray nozzles are capable of spraying the entire upper surface area thereof. As in the embodiment shown in FIGS. 1-2, the spray pipes and nozzles are arranged such that the sprays impinge the screen at an acute angle. The sprays also urge the larger particles towards the central discharge opening. These particles follow a spiral path towards the opening and are kept in continuous motion by the sprays. There is no particle build-up due to "dead" spots on the screen where sprays fail to impinge. Rotating the arms in the direction of the leading edges of the spray pipes also assists the operation. The sprays will hit the screen at a higher velocity than if rotation occurred in the opposite direction. The sprays may be water, steam, air, or other substances depending upon the particular application of the device. A portion of the liquid passing through the screen may be recirculated.

Thus a simple, rugged and easy to use separation unit is provided which will require a minimum of operating power and maintenance.

What is claimed is:

1. A filter separation device including a filter screen, a surface of said filter screen, means for flowing a first liquid containing particulate over said surface, a particulate receiving opening formed in said screen, and spray nozzles above said surface and arranged with respect to said screen to impinge cleansing liquid on said surface at an angle thereto in the range of 10° to 45° to direct particulate disposed thereon by said first liquid towards said opening, rotary support means for rotating said spray nozzles about an axis which passes through said opening, said spray nozzles further being arranged on said rotary support means such that said cleansing liquid can carry particulate continuously and in a spiral fashion towards said particulate receiving opening.

2. A filter device in accordance with claim 1 in which said spray nozzles are supported by and distributed along respective leading concave edges of radially disposed spray pipes, each of which is of arced configuration.

3. A filter device in accordance with claim 1 in which the means for flowing said first liquid includes a feed container, means for introducing said first liquid into said feed container, a second container within said feed container, a second wall of said second container, said screen being supported by said second wall, said second wall constructed and arranged to allow said first liquid to overflow said screen upon said liquid reaching a predetermined level within said feed tank.

4. A filter device in accordance with claim 3 in which a third container is provided within said second container beneath said opening for receipt of materials passing therethrough.

5. A filter device in accordance with claim 4 in which first and second removal means are provided for removal respectively of materials passing through said opening and into said second container, and through said screen and into said first container.

6. A filter device in accordance with claim 1 in which said rotary support means includes a rotatable shaft and said spray nozzles are supported by and distributed along respective leading edges of cane-shaped spray pipes, said spray pipes having an arcuate end secured to said rotatable shaft and a straight portion, said spray nozzles being distributed along said straight portion.

7. A filter device in accordance with claim 1 wherein said rotary support means includes a spray pipe and said spray nozzles are supported by said spray pipe, said spray nozzles being positioned along a leading edge of said pipe, and said pipe is rotated by said rotary support means in the direction of said leading edge.

* * * * *